US006118367A

United States Patent [19]
Ishii

[11] Patent Number: 6,118,367
[45] Date of Patent: Sep. 12, 2000

[54] DATA CARRIER SYSTEM

[75] Inventor: Eiichi Ishii, Tokyo, Japan

[73] Assignee: Yoshikawa RF Systems Co., Ltd., Kitakyusyu, Japan

[21] Appl. No.: 08/975,197

[22] Filed: Nov. 20, 1997

[30] Foreign Application Priority Data

Nov. 29, 1996 [JP] Japan .................................... 8-319519

[51] Int. Cl.$^{7}$ ........................................................ H04Q 5/22

[52] U.S. Cl. .................................... 340/10.1; 340/825.31; 340/572.1; 340/572.5; 343/895; 343/866; 455/41; 455/193.1

[58] Field of Search ......................... 340/825.54, 825.31, 340/10.1, 572.1, 572.5, 572.7; 343/895, 866, 867, 868, 844, 745, 748, 834, 839, 912, 913; 455/41, 120, 123, 125, 193.1, 121, 197.3; 334/63, 71; 342/51

[56] References Cited

U.S. PATENT DOCUMENTS

| | | | |
|---|---|---|---|
| 4,864,633 | 9/1989 | Chatelot | 455/41 |
| 5,153,583 | 10/1992 | Murdoch | 340/825.54 |
| 5,258,766 | 11/1993 | Murdoch | 343/867 X |
| 5,287,113 | 2/1994 | Meier | 342/51 |
| 5,406,262 | 4/1995 | Herman et al. | 340/572.5 |
| 5,500,651 | 3/1996 | Schuermann | 342/42 |
| 5,694,139 | 12/1997 | Saito et al. | 343/866 |
| 5,808,587 | 9/1998 | Shima | 343/895 |

*Primary Examiner*—Brian Zimmerman
*Assistant Examiner*—Yves Dalencourt
*Attorney, Agent, or Firm*—Pollock Vande Sande & Amernick, R.L.L.P.

[57] ABSTRACT

A data carrier system is provided including: a main apparatus including a first control unit for outputting a first signal and a first coil unit having at least a transmission coil for transmitting the first signal; a tuner circuit unit having a tuner circuit being tuned with the frequency of the first signal, the tuner circuit having a tuning coil disposed facing the transmission coil of the first coil unit; and a tag including a second coil unit having at least a reception coil and a second control unit for performing a predetermined control operation in accordance with the first signal transmitted from the main apparatus and received by the reception coil of the second coil unit.

16 Claims, 5 Drawing Sheets

DATA CARRIER SYSTEM

BACKGROUND OF THE INVENTION

1. Field of the Invention

The present invention relates to a data carrier system for signal transmission between a main apparatus and a tag, and more particularly to a data carrier system for signal transmission between a main apparatus equipped with a power source and a tag with no power source, by utilizing electromagnetic coupling between a transmission/reception coil of the main apparatus and a transmission/reception coil of the tag.

2. Description of the Related Art

A data carrier system for signal transmission between a main apparatus and a tag by radio waves is used, for example, with a gate system for a ski lift. The tag has a transmission/reception mechanism and a memory and is held by a skier on his or her arm like a wrist watch. The memory stores various data, for example, a term for using the lift, the number of remaining times allowed to use the lift, and the like. The main apparatus issues an enquiry to the tag. As a skier passes near the main apparatus, the tag receives a signal from the main apparatus and starts its operation while producing electric power from the received signal. The tag reads data from its memory, according to the contents of the enquiry, and sends it back to the main apparatus. In accordance with this data transmitted from the tag, the main apparatus judges whether the skier is allowed to use the lift, and controls the gate to open or close. Such a data carrier system is widely used in various applications, not only in a ski lift gate system but also in an automatic train gate system, in an antitheft system in which a tag is fixed to each good for sale, and in other systems.

In such a data carrier system, a communication distance between the main apparatus and the tag is generally set to about 20 cm in order to discriminate individually the different tags passing near the main apparatus. However, this communication distance may be required to be set longer, depending upon the use of the data carrier system. In this case, it is required to produce a strong signal from the main apparatus. However, since the tag operates by an electric power produced from its receiving signal, it is necessary for the main apparatus produce a fairly strong output. Thus, the main apparatus transmits a strong signal even when the tag passes very near the main apparatus, resulting in wasteful consumption of the power in the main apparatus.

One example of such systems is disclosed, for example, in U.S. Pat. No. 5,500,651, entitled "System and Method for Reading Multiple RF-ID transponders" issued to J. Schuermann and corresponding Japanese Patent Kokai JP-A-8-180152. In this system, signals are transmitted between transponders and a reader. However, an object of this patent is to enable the reader to discriminate many transponders, which pass near the reader, from one another. However, the patent does not describe how to increase a communication service distance between the reader and each transponder.

SUMMARY OF THE INVENTION

It is an object of the pr es ent invention to provide a data carrier system for signal transmission between a main apparatus having power source and a transmission/reception coils and a tag having a transmission/reception coil or coils and operating by an electric power supplied from the main apparatus, wherein the system is provided with means for increasing a communication distance between the main apparatus and the tag without increasing electric power of the power source.

The data carrier system of this invention comprises a main apparatus including first control means for outputting a first signal and first coil means having at least a transmission coil for transmitting the first signal; tuner circuit means having a tuner circuit including a tuning coil disposed facing the transmission coil of the first coil means and adapted to be tuned with the frequency of the first signal; and a tag including second coil means having at least a reception coil for receiving the first signal transmitted from the main apparatus and second control means for performing a predetermined control operation in accordance with the received first signal.

A tag monitor for use with the data carrier system of this invention comprises: a main apparatus including first control means for outputting a first signal and first coil means having at least a transmission coil for transmitting the first signal toward a tag to be monitored; and tuner circuit means having a tuner circuit including a tuning coil disposed facing the transmission coil of the first coil means and a capacitor connected in parallel to the tuning coil, so as to be tuned with the frequency of the first signal, the tuner circuit means being disposed spaced apart from the main apparatus by a predetermined distance so that a passage may be provided between the main apparatus and the tuner circuit means for allowing the tag to be monitored to pass therethrough.

According to the present invention, a tuning coil of the tuner circuit is provided facing the transmission coil of the main apparatus, and the tag to be monitored moves between the main apparatus and the tuner circuit. Accordingly, electromagnetic coupling between the transmission coil of the main apparatus and the reception coil of the tag is strengthened to thereby improve the efficiency in transmission of a signal between the main apparatus and the tag.

DETAILED DESCRIPTION OF THE PREFERRED EMBODIMENTS

A data carrier system according to an embodiment of the invention will be described with reference to the accompanying drawings.

Figure 1A:
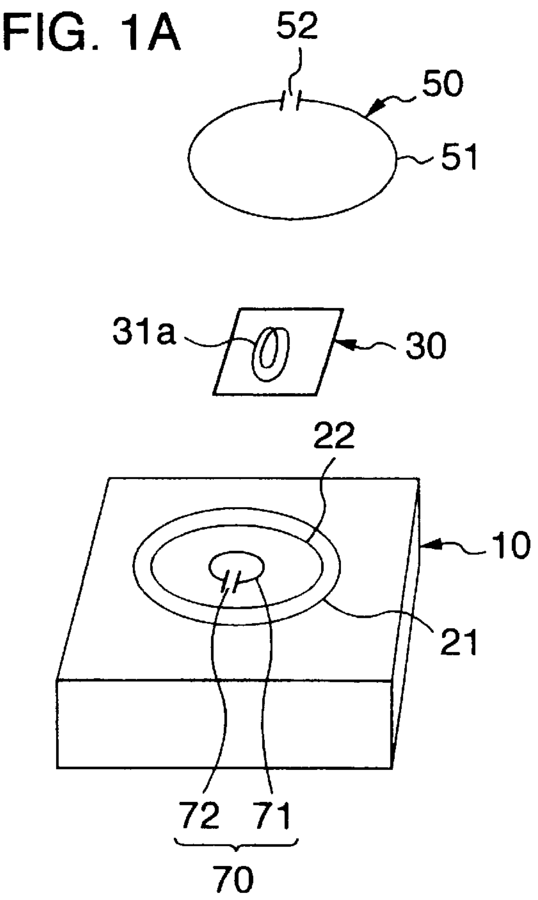
FIG. 1A is a schematic diagram showing the structure of a data carrier system according to an embodiment of the invention.

A data carrier system shown in FIG. 1A has an interrogator 10 as a main apparatus, a tag 30, a first tuner circuit 50 and a second tuner circuit 70. This tag 30 has a size of, for example, a name card, and is mounted on a predetermined object. In this data carrier system, signals are transmitted between the interrogator 10 and a tag 30 passing near the interrogator 10, and then the interrogator 10 receives data stored in the tag 30.

The interrogator 10 has a transmission coil 21 for transmitting a signal supplied from a controller 11 to the tag 30, and a reception coil 22 for receiving a signal transmitted from the tag 30. The tag 30 has a reception coil 31*a* for receiving a signal from the interrogator 10. The first tuner circuit 50 has a tuning coil 51. This first tuner circuit 50 is provided for increasing a distance by which a signal can be reliably transmitted between the interrogator 10 and the tag 30. The present invention has a feature in the provision of this first tuner circuit 50.

Figure 1B:
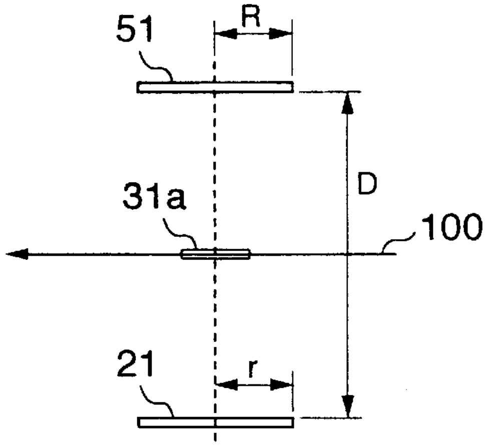
FIG. 1B is a diagram showing the positional relationship among a transmission coil, a first tuning circuit, and a tag in the data carrier system shown in FIG. 1A.

The positional relationship among the interrogator 10, first tuner circuit 50 and tag 30 in application will be described with reference to FIG. 1B. The transmission coil 21 of the interrogator 10 is formed in a plane having a shape of circle or rectangle, preferably square. The tuning coil 51 of the first tuner circuit 50 is also formed in a plane preferably having the same shape as the transmission coil 21. If the transmission coil 21 is formed in a circle having a radius r, the tuning coil is formed in a circle preferably having a radius R≈r. If the transmission coil 21 is made in a square, the tuning coil 51 is also made in a square having a side preferable of the same length as the side of the transmission coil. As shown in FIG. 1B, the transmission coil 21 and tuning coil 51 are positioned substantially parallel and coaxial, i.e., the center axis of the transmission coil 21 is coincide with the center axis of the tuning coil 51. As will be later detailed, the tag 30 may have a transmission/reception common coil 31*a* formed on a plane, or a transmission coil 31*a* and a reception coil 32*a* separately formed on a plane.

During the operation of the data carrier system, the tag moves along a passage 100 between the coil 21 of the interrogator 10 and the coil 51 of the first tuner circuit 50, with the flat surface of the tag being substantially in parallel to the flat surface of the coil 21 of the interrogator 10, as shown in FIG. 1B. This motion of the tag may be realized either by a user who has the tag in hand and moves it along a predetermined passage, or by automatically transporting the tag along the passage 100. The interrogator 10 and first tuner circuit 50 function as a tag monitor for supervising the contents stored in the tag.

Figure 2:
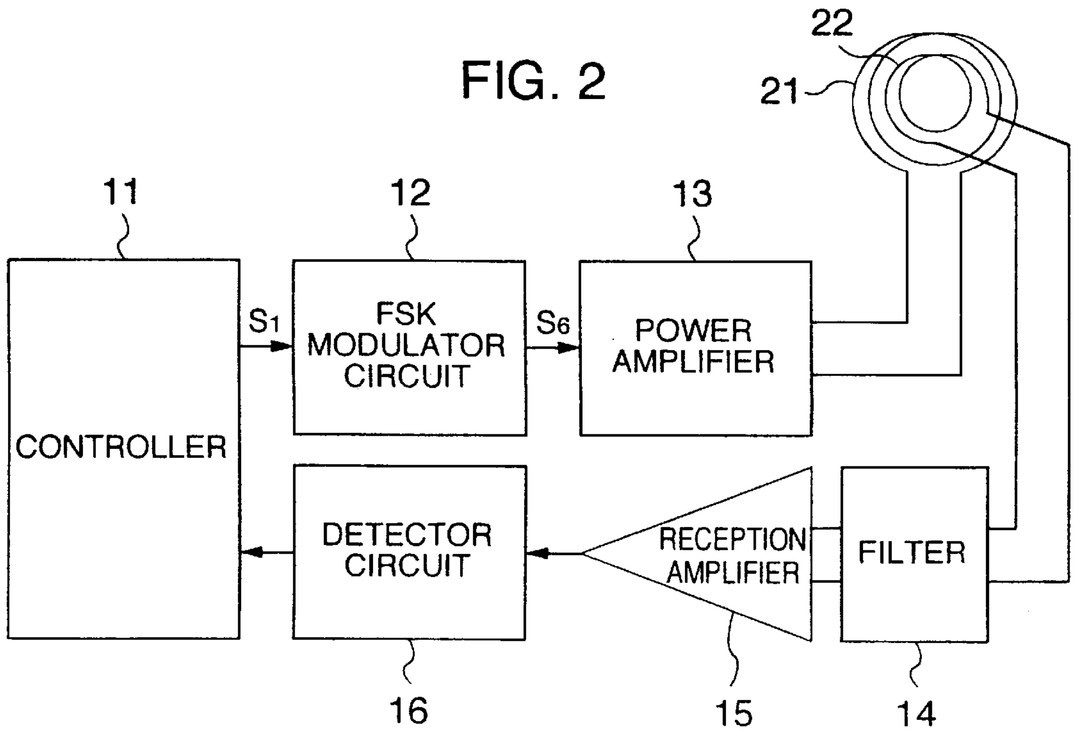
FIG. 2 is a block diagram showing the structure of an interrogator of the data carrier system shown in FIG. 1A.

As shown in FIG. 2, the interrogator 10 has a controller 11, an FSK modulator circuit 12, a power amplifier 13, a filter 14, a reception amplifier 15, a detector circuit 16, a transmission coil 21, and a reception coil 22. A circuit portion including the controller 11, FSK modulator circuit 12 and power amplifier 13 is called a first control means.

Generally, a tag randomly moves along the passage 100. Therefore, the interrogator 10 repeatedly transmits a specific call signal at a predetermined interval, e.g., 1 to 10 times/sec, and the tag receiving this signal transmits a specific acknowledge signal. Upon reception of this acknowledge signal, the interrogator 10 judges that a tag is now moving along the passage 100, and transmits a regular enquiry signal. The controller 11 controls the transmission of the tag call signal and the regular enquiry signal and judges the contents of the acknowledge signal received from a tag, a signal responding to the enquiry signal, and other signals.

Figure 3:
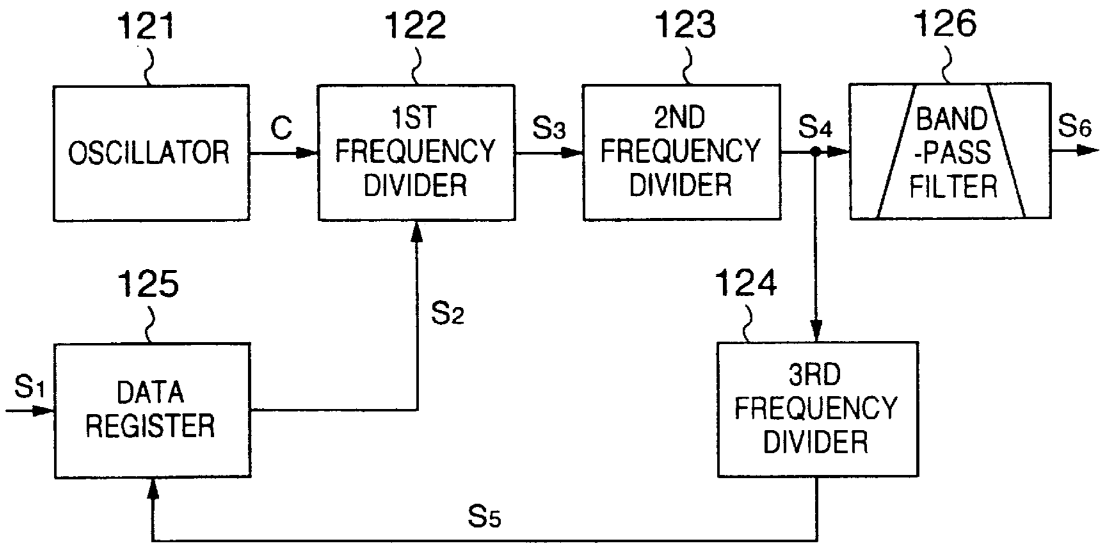
FIG. 3 is a block diagram showing the structure of an FSK modulator circuit of the interrogator shown in FIG. 2.

The FSK modulator circuit 12 modulates a binary signal sent from the controller 11 into an FSK (Frequency Shift Keying) signal which contains two different frequencies. Specifically, this FSK modulator 12 includes, as shown in FIG. 3, an oscillator 121, a first frequency divider 122, a second frequency divider 123, a third frequency divider 124, a data register 125 and a band-pass filer 128.

The data register 125 stores a binary signal $S_1$ sent from the controller 11. The data register 125 supplies this binary signal $S_1$ as a control signal $S_2$ to the first frequency divider 122. A reference clock C, produced from the oscillator 121, is supplied to the first frequency divider 122. The frequency of the reference clock C is set to 16.0 MHz. The first frequency divider 122 divides the frequency of the reference clock C by a frequency division ratio which is one of 1/16 and 1/17 determined by the control signal $S_2$ supplied from the data register 125. For example, if the control signal $S_2$ is "1", the first frequency divider 122 operates at a frequency division ratio of 1/16, whereas if the control signal $S_2$ is "0", it operates at a frequency division ratio of 1/17. The second frequency divider 123 divides the frequency of an output signal $S_3$ from the first frequency divider 122 by "8". An output signal $S_4$ of the second frequency divider 123 is sent to the band-pass filter 126 and also to the third frequency divider 124.

The third frequency divider 124 divides the frequency of an output signal from the second frequency divider 124 by "16". An output signal $S_5$ from the third frequency divider 124 is supplied as a data clock to a clock terminal (not shown) of the data register 125. The control signal $S_2$ for switching the division ratio of the first frequency divider 122 is supplied from the data register 125 to the first frequency divider 122, synchronously with the output signal $S_5$ (a signal obtained by frequency-dividing the output signal of the first frequency divider 122 by "128") of the third frequency divider 124.

Therefore, if the control signal $S_2$ is "0", the frequency of the output signal $S_4$ of the second frequency divider 123 is:

$$(16\ \text{MHz}/17)\times(1/8)=111.647\ \text{KHz}$$

whereas if the control signal $S_2$ is "1", the frequency of the output signal $S_4$ of the second frequency divider 123 is:

$$(16\ \text{MHz}/16)\times(1/8)=125\ \text{KHz}.$$

The third frequency divider 124 generates the signal $S_5$ every 16 cycles of the signal $S_4$, and in response to this signal $S_5$, the data register 125 supplies the next binary signal $S_2$ to the first frequency divider 122.

The band-pass filter 126 shapes the output signal $S_4$ from the second frequency divider 123 into a sine wave to suppress its side bands. A signal output from the band-pass filter 126 is sent as an FSK modulated signal $S_6$ to the power amplifier 13 and, after this power amplification, it is supplied to the transmission coil 21. The frequency of the FSK modulated signal $S_6$ is the same as the signal $S_4$ which is 125 kHz when the control signal $S_2$ is "1" and about 117 KHz when the control signal $S_2$ is "0". In the above manner, the interrogator 10 issues an enquiry from the transmission coil 21 to the tag 20 while switching its frequency between two different frequencies. Each enquiry transmitted from the interrogator is made of, for example, 12 bits.

The filter 14 filters a signal received by the reception coil 22 to pick up a signal having a desired frequency. A signal picked up by the filter 16 is amplified by the reception amplifier 15 and sent to the detector circuit 16 which demodulates the signal amplified by the reception amplifier 15 into a binary signal which is then supplied to the controller 11.

The following studies were made by the inventor in order to determine the size of the transmission coil 21. A magnetic field intensity H at a distance d along the center axis of a circular coil having a radius r, from the center of the coil is given by:

$$H=nIr^2/2(r^2+d^2)^{3/2} \quad (1)$$

where I is a current flowing through the circular coil, and n is the number of turns of the coil. A power P consumed by the coil is proportional to a maximum energy $LI^2/2$, stored in the coil, where L is a self inductance of the coil. In the case of a circular coil, the self inductance L is proportional to a square of the coil radius r and therefore to an area of the coil. As the current I or the coil radius r is made larger, the consumption power P of the coil becomes larger. However, this coil consumption power P has a limit value in practical use. The above equation (1) was therefore studied on the assumption that the power P is constant.

Figure 7:
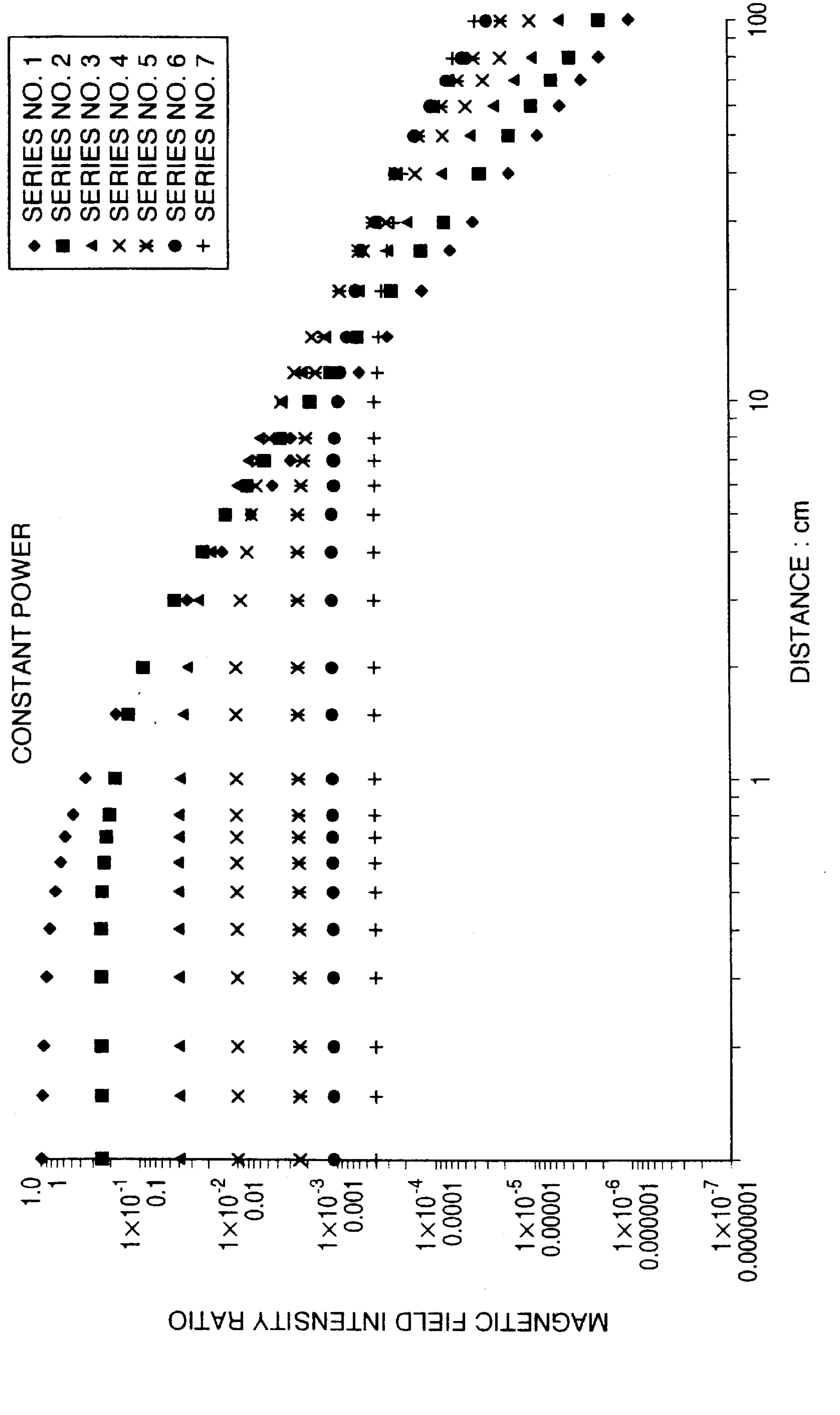
FIG. 7 is a graph showing the relationship between a magnetic field intensity along a central axis of a circular coil and a distance from the center of the circular coil under a condition of constant electric power using the radius of the circular coil as a parameter.

The magnetic field intensity given by the equation (1) is represented by Ho when the coil radius r=1 cm and the distance d=0.1 cm. The relationship between the distance d and the magnetic field intensity ratio H/Ho is given in the graph of FIG. 7 for each of various values of the radius r on the assumption that the power P is constant. Series No. 1 is for the coil radius r of 1 cm, series No. 2 is for the coil radius r of 2 cm, series No. 3 is for the coil radius r of 5 cm, series No. 4 is for the coil radius r of 10 cm, series No. 5 is for the coil radius r of 20 cm, series No. 6 is for the coil radius r of 30 cm, and series No. 7 is for the coil radius r of 50 cm.

As seen from this graph, if the distance d is very short, for example, if d=0.1 cm, the smaller the radius r, the stronger the magnetic field intensity H. Conversely, if the distance d is long, for example, if d=100 cm, the larger the radius r, the stronger the magnetic field intensity H. If the distance d is constant at a middle, for example, if d=10 cm, the coil having a radius r=10 cm nearly equal to the distance d generates a maximum magnetic field intensity H. It is therefore certain that if the radius r is nearly equal to the distance d, it is efficient in view of the electric power. From the economical viewpoint, however, it is desired to make the system as compact as possible so that a large coil is not preferable. In this embodiment, therefore, in order to make power consumption as small as possible and make the system compact, a plane loop coil having a diameter r of about 20 cm is used as the transmission coil 21. The shape of the transmission coil is not necessarily limited to a circle. For example, a rectangular shape may be used. If a rectangular coil is used, the size of this coil is determined so that the radius of an equivalent circular coil having the same area as that of the rectangular coil is 20 cm.

For the reception coil 22, a plane loop coil having a radius of about 15 cm, smaller than the transmission coil 21, is used. The transmission coil 21 and reception coil 22 are disposed concentrically on the same plane.

The first tuner circuit 50 has, as shown in FIG. 1A, a plane loop coil 51 and a capacitor 52 connected in parallel with the coil 51. The tuning frequency of the first tuner circuit 50 determined by the coil 51 and capacitor 52 is set generally equal to the frequency of a signal to be transmitted from the interrogator 10. As described earlier, in this embodiment, a signal containing two different frequencies 125 KHz and 117 KHz is transmitted. Therefore, the tuning frequency is set to an average value of two different frequencies, i.e., 121 KHz. The radius R of the coil 51 is about 20 cm, equal to the radius r of the transmission coil 21 of the interrogator 10 as described above.

As shown in FIG. 1B, the plane coil 51 of the first tuner circuit 50 is disposed parallel with the plane coil 21 of the interrogator 10, and preferably concentric with the latter coil 21. As the tag 30 moves along the passage 100 between the coil 51 and the transmission coil 21, it receives a signal from the interrogator 10. The interrogator 10 and the first tuner circuit 50 function as a tag monitor for monitoring the contents stored in a tag passing through a path between the interrogator 10 and the first tuner circuit 50.

A distance between the passage 100 and the interrogator 10 is set so that the tag 30 moves through a position in a range within a maximum service distance for communication between the coil 31*a* and the transmission coil 21 of the interrogator 10. As will be later described, the first tuner circuit 50 is provided to increase a communication service distance between the interrogator 10 and tag 30. The passage 100 of the tag 30 is positioned between the transmission coil 21 of the interrogator 10 and the coil 51 of the first tuner circuit 50. In this embodiment, a distance D between the coil 51 and the transmission coil 21 is set to about 50 cm. Setting this distance will be later detailed.

As also shown in FIG. 1A, the second tuner circuit 70 has a plane loop coil 71 and a capacitor 72 connected in parallel with the coil 71. The tuning frequency determined by the coil 71 and the capacitor 72 of the second tuner circuit 70 is set to a value nearly equal to a signal transmitted from the tag 30 to the interrogator 10, for example, to about 60 KHz. The coil 71 has a diameter smaller than that of the coil 21, for example, about 7.5 cm, and is placed concentrically with and on the same plane as the coil 21.

The concentrical arrangement of the transmission coil 21, reception coil 22 and coil 71 on the same plane makes the interrogator 10 compact.

Figure 4A:
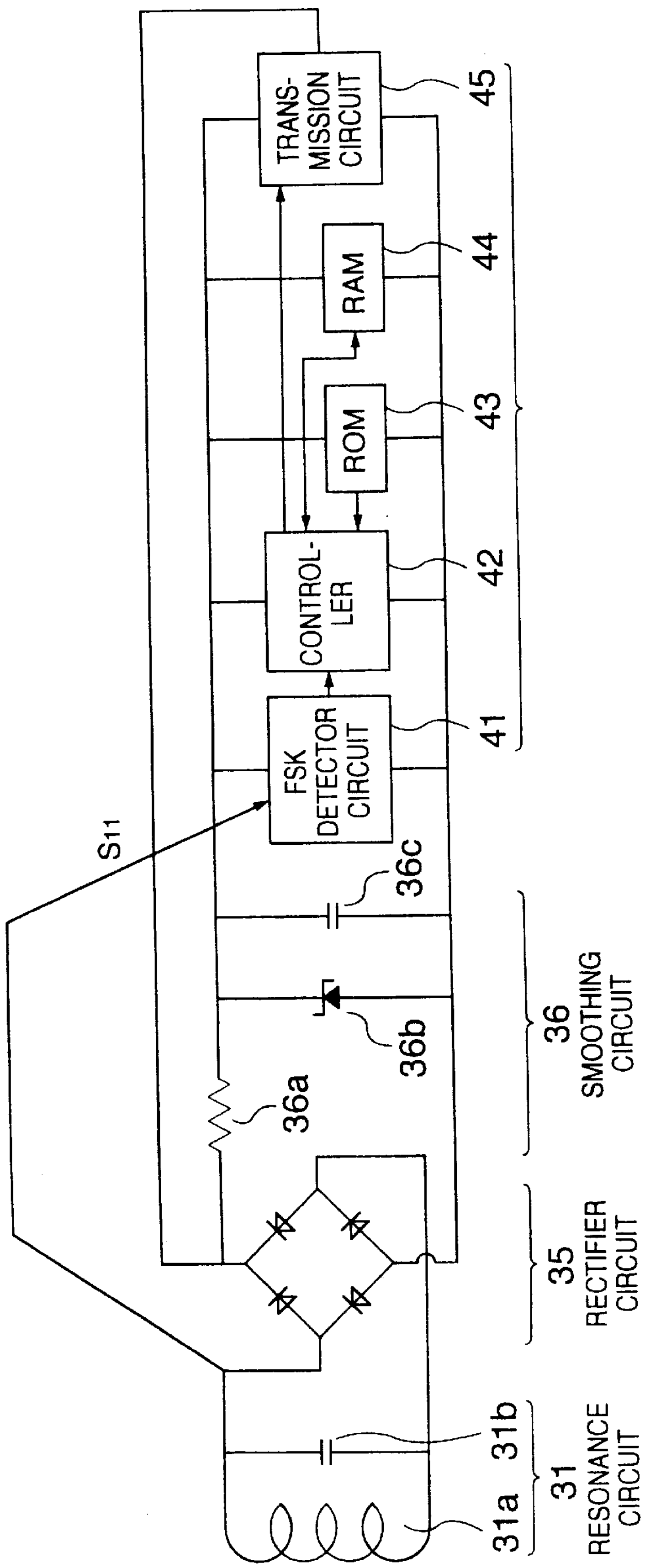
FIG. 4A is a schematic block diagram showing the structure of a data carrier system in which a tag has a common transmission/reception coil.

Next, the tag 30 used by the data carrier system of this embodiment will be described. As shown in FIG. 4A, the tag 30 is constituted of a resonance circuit 31, a rectifier circuit 35, a smoothing circuit 36, an FSK detector circuit 41, a controller 42, a ROM 43, a RAM 44, and a transmission circuit 45. The FSK detector circuit 41, controller 42, ROM 43, RAM 44 and transmission circuit 45 constitute a second control means. Generally, the tag 30 has no power source such as a battery because of the required maintenance or the like. Therefore, the tag 30 operates by an electric power obtained from a signal received by the resonance circuit 31. To this end, the tag 30 is provided with the rectifier circuit 35 and smoothing circuit 36.

The resonance circuit 31 has a transmission/reception coil 31*a* for electromagnetic coupling with the transmission coil 21, and a capacitor 31*b*. The transmission/reception coil 31*a* receives a signal transmitted from the transmission coil 21 of the interrogator 10 through electromagnetic coupling therewith, and generates a magnetic field for transmitting a signal back to the interrogator 10. The resonance frequency of the resonance circuit 31 is generally equal to the frequency of an A.C. signal transmitted from the transmission coil 21 via the FSK modulator circuit 12 of the interrogator 10. Since the FSK modulator circuit 12 supplies an A.C. signal containing two different frequencies 125 KHz and 117 KHz to the transmission coil 21, the resonance frequency of the resonance circuit 31 is set to an average value of the two different frequencies, i.e., 121 KHz.

Figure 4B:
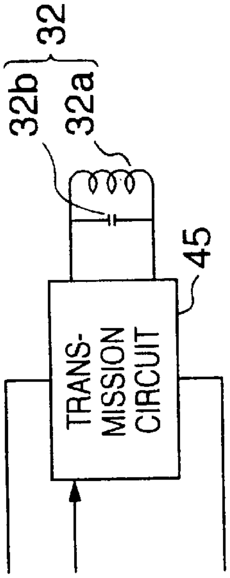
FIG. 4B is a schematic block diagram showing the structure of a data carrier system in which a tag has separately a transmission coil and a reception coil.

Although the common transmission/reception coil 31*a* is used in the tag 30 in the embodiment of FIG. 4A, this coil 31*a* may be used for the reception only and a transmission exclusive coil 32*a* may be provided separately. In this case, as shown in FIG. 4B, the transmission coil 32*a* is connected to the transmission circuit 45 and a capacitor 32*b* is connected in parallel to this coil 32*a*.

The transmission/reception coil 31*a* is formed by printing spiral patterns having a predetermined shape of conductive material, respectively, on the front and back surfaces of a plane resin film, and by serially connecting the two printed coils. If the transmission coil and a reception coil are formed separately, each coil is formed in the similar manner as above, by concentrically printing two coil patterns on each of the front and back surfaces of a resin film. Various ICs constituting the tag are mounted on the resin film in an area which is not occupied by the transmission/reception coil.

The size of the transmission coil 31*a* is smaller than the reception coil of the interrogator 10, and in the case of a circular coil, has a diameter of about 3 to 4 cm. If a rectangular coil is used, the area of this coil is set so that a diameter of an equivalent circular coil having the same area as that of the rectangular coil is about 3 to 4 cm. The number of turns of this coil 31*a* is about 50.

An electromotive force induced by a magnetic field generated by the transmission coil 21 is generated on the transmission/reception coil 31*a* of the resonance circuit 31. The induction current generated by this electromotive force is rectified by the rectifier circuit 35 and smoothed by the smoothing circuit 36. The smoothing circuit 36 has a resistor 36*a*, a zener diode 36*b* and a capacitor 36*c*. Electric charges are accumulated in this capacitor 36*c* and a power source voltage appears across the capacitor 36*c*, having a voltage determined by its capacitance. This power source voltage is applied to the FSK detector circuit 41, controller 42, ROM 43, RAM 44 and transmission circuit 45 to start operation of each circuit portion. In this embodiment, the tag 30 is designed to normally operate at an induced electromotive force of 13 $V_{pp}$. $V_{pp}$ is a peak-to-peak voltage represented by "volt". A voltage of 13 $V_{pp}$ corresponds to an induced electromotive force having a peak value of 6.5 V. The zener diode 36*b* of the smoothing circuit 36 prevents breakage of each circuit portion when the voltage rises over a predetermined value.

Figure 5:
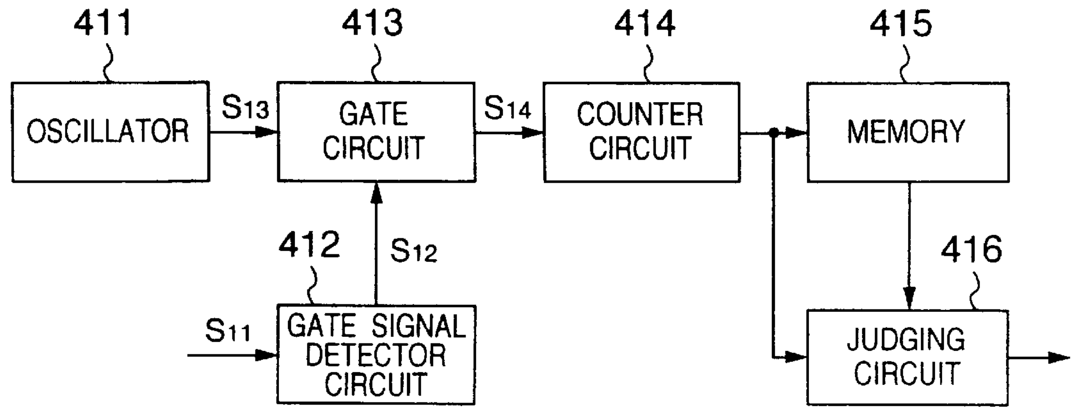
FIG. 5 is a block diagram showing the structure of an FSK detector circuit of the tag shown in FIG. 4A.

The FSK detector circuit 41 demodulates a FSK modulated signal received by the transmission/reception coil 31*a*. Specifically, as shown in FIG. 5, the FSK detector circuit 41 has an oscillator 411, a gate signal detector circuit 412, a gate circuit 413, a counter circuit 414, a memory 415, and a judging circuit 416.

An FSK modulated signal (input signal) $S_{11}$ received by the resonance circuit 31 is input to the gate signal detector circuit 412. A gate signal $S_{12}$ produced from the gate signal detector circuit 412 is supplied to a control terminal of the gate circuit 413. An output $S_{13}$ from the oscillator 411 is supplied via the gate circuit 413 to a counter circuit 414. An output of the counter circuit 414 is supplied to the memory 414 and a first input terminal of the judging circuit 416, and an output of the memory 415 is supplied to a second input terminal of the judging circuit 416. The FSK modulated input signal $S_{11}$ has a modulation cycle corresponding to 16 cycles of the carrier signal. Therefore, the period of one bit of digital data transmitted from the interrogator and received by the coil 31*a* corresponds to 16 cycles of the carrier signal. An oscillation frequency of the oscillator 411 is set to 3 MHz.

Figure 6:
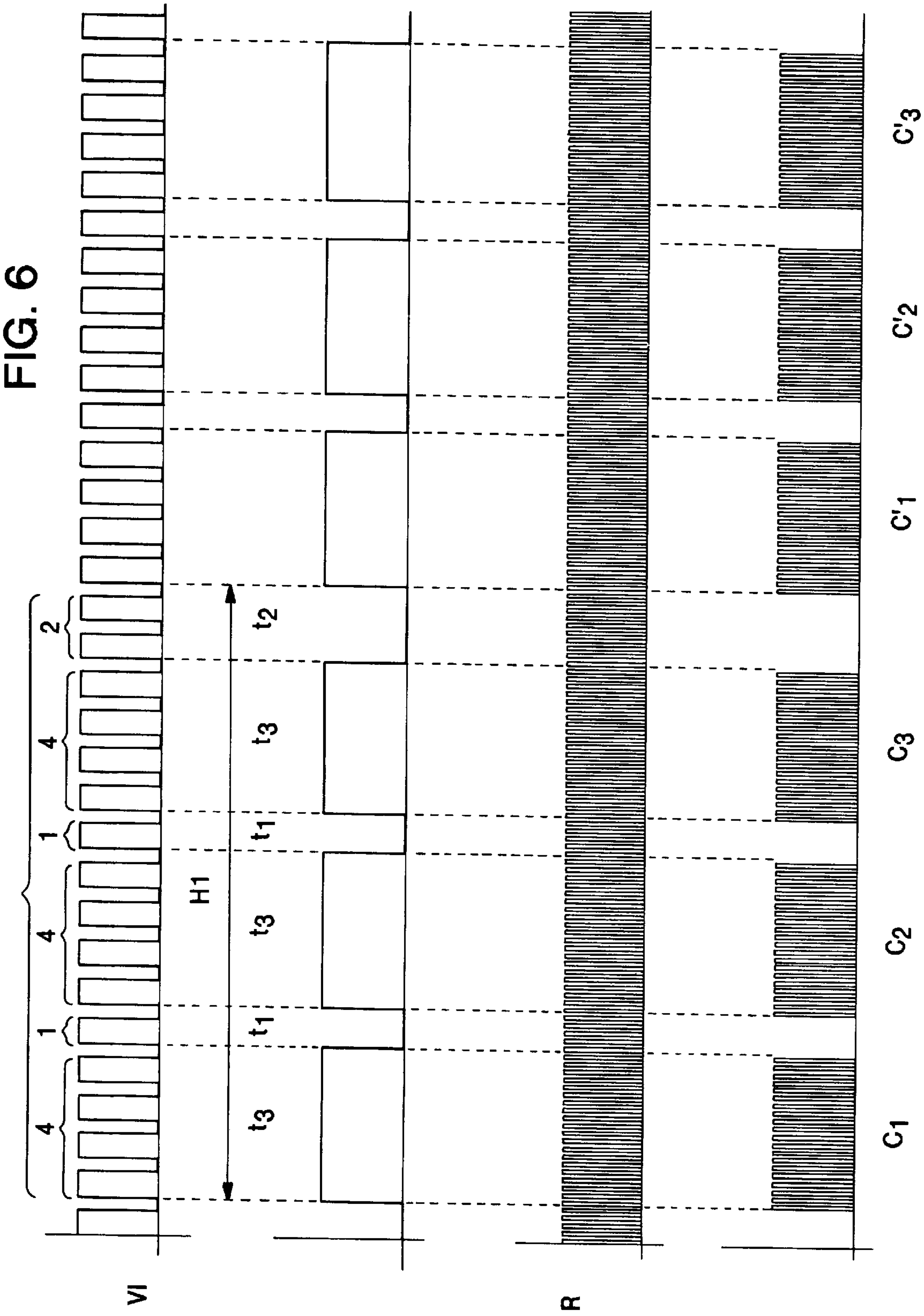
FIG. 6 is a diagram showing signal waveforms at respective portions of the FSK detector circuit shown in FIG. 5 for illustrating the circuit operation.

A waveform of the input signal $S_{11}$ is indicated at FIG. 6(*a*), the gate signal $S_{12}$ detected by the gate signal detector circuit 412 is indicated at FIG. 6(*b*), an output $S_{13}$ of the oscillator 411 is indicated at FIG. 6(*c*), and an output $S_{14}$ of the gate circuit 413 is indicated at FIG. 6(*d*). As indicated at FIG. 6(*b*), the gate signal detector circuit 412 generates each gate signal $S_{12}$ having a time duration corresponding to 4 cycles of the input signal $S_{11}$, with a one-cycle or two-cycle interval between every two consecutive gate signals $S_{12}$. This is because the FSK modulation cycle of the input signal $S_{11}$ corresponds to 16 cycles of the carrier signal. More specifically, the interval between gate signals $S_{12}$ is set so that the gate signal detector circuit 412 performs its operation at a repetition period of 16 cycles of the input signal $S_{11}$, the repetition period of 16 cycles being a total of two time durations $t_1$ each corresponding to one cycle of the input signal $S_{11}$, one time duration $t_2$ corresponding to two cycles of the input signal $S_{11}$, and three time durations $t_3$ each corresponding to a time duration of the gate signal $S_{12}$. This repetition period is one modulation cycle (a period $H_1$ shown in FIG. 6.).

The gate circuit 413 supplies the output $S_{12}$ of the oscillator 411 to the counter circuit 414 only during the time duration $t_3$ of the gate signal $S_{12}$. The counter circuit 414 counts the pulses included in the output $S_{13}$ of the oscillator 411 supplied from the gate circuit 413, and supplies its count values to the memory 415 and the judging circuit 416. The memory 145 stores the count values $C'^1$, $C'_2$ and $C'_3$ of the three gate signal time durations $t_3$ during one modulation cycle. The judging circuit 416 compares the count values supplied from the counter circuit 414 during the next modulation cycle with those before one modulation cycle, respectively at corresponding gate signal time durations $t_3$. Namely, the count values $C'_1$, $C'_2$ and $C'_3$ indicated at FIG. 6(*d*) are compared with the count values $C_1$, $C_2$ and $C_3$ obtained before one modulation cycle. The count value when the input signal $S_{11}$ has the FSK modulated higher carrier frequency $f_{HIGH}$ (=125 KHz) is different by more than "4" from that when the input signal $S_{11}$ has the FSK modulated lower carrier frequency $f_{LOW}$ (=117 KHz). It is therefore possible to judge from a difference between the count values whether the input signal has the FSK modulated higher or lower carrier frequency $f_{HIGH}$ or $f_{LOW}$. Incidentally, a known binary signal of "1" or "0" is included at a leading end of the first binary signal as transmitted from the interrogator to the tag, so that whether the subsequent binary signal is "0" or "1" is judged with reference to the carrier frequency of the known binary signal.

ROM 43 stores a predetermined program and RAM 44 stores predetermined data. In accordance with a signal produced from the FSK detector circuit 41, the controller 42 judges the contents of an enquiry issued by the interrogator 10, and supplies a signal selected according to the enquiry to the transmission circuit 45. For example, the signal supplied to the transmission circuit 44 may be a signal for acknowledging that the tag 30 is near the interrogator 10, a signal regarding ID information of the tag 30, a signal representative of data stored in RAM 44, or any other selected signal.

In accordance with the signal supplied from the controller 42, the transmission circuit 45 performs AM modulation on a power source current obtained from the signal received by the transmission/reception coil 31*a* and transmits the AM modulated signal. The transmission circuit 45 includes a resistor and a switch. When the switch is closed, the power source current flows through the resistor and the power is consumed by the resistor, whereas when the switch is opened, the power source current by-passes the resistor as it is. The transmission circuit 45 controls the open/close of the switch in accordance with the binary signal supplied from the controller 42. Accordingly, the load of the power source changes and hence a magnetic field generated by the coil 31*a* of the resonance circuit 31 also changes. In this manner, the signal received by the resonance circuit 31 is simultaneously AM modulated thereby producing a magnetic field correspondingly. For example, when a signal having the carrier frequency of 125 KHz is received, a signal having an AM modulation frequency of 62.5 KHz is transmitted back to the interrogator. Therefore, in this embodiment, the tag 30 is not required to have separately both transmission and reception coils, but one coil can be used in common for transmission and reception. The resistor 36*a* functions as a balancer which prevents the current supplied to the rectifier circuit 35 from the transmission circuit 45 from flowing too much into the smoothing circuit 36.

The signal transmitted from the transmission/reception coil 31*a* of the tag 30 is received by the reception coil 22 of the interrogator 10. The filter 14 of the interrogator 10 filters picks up only the side band of the received signal. This picked-up side band is amplified by the reception amplifier 15 and demodulated by the detector circuit 16.

Next, experiments made by the inventor with respect to the data carrier system of this embodiment will be described.

The inventor first checked how a communication distance of a signal transmitted from the interrogator 10 to the tag 30 depending on the presence or absence of the first tuner circuit 50.

First, the first tuner circuit 50 was removed from the data carrier system. The distance between the tag 30 and the interrogator 10 was set sufficiently short, e.g., 0.1 cm, so that the transmission/reception coil 31*a* of the tag 30 was facing the transmission coil 21 of the interrogator 10 (State I). In this State I, an electromotive force of about 30 $V_{pp}$ was induced at the tag 30 so that the system operated under a good condition. Next, the tag 30 was gradually separated from the interrogator 10 along the center axis of the transmission/reception coil 31*a* and the transmission coil 21. An electromotive force induced at the tag 30 was gradually lowered, and at a distance of about 30 cm, the induced electromotive force was reduced lower than 13 $V_{pp}$ so that the tag 30 could not operate in a satisfactory condition. As the tag 30 was further spaced apart from the interrogator 10, the induced electromotive force was reduced to about 9 $V_{pp}$ at a distance of about 40 cm and the tag 30 completely stopped its operation. The tag 30 was then fixed to this position with the induced electromotive force of about 9 $V_{pp}$ (State II). Then, in this State II, the first tuner circuit 50 was set at a position on the side opposite to the interrogator 10 with respect to the tag 30, with the coil 51 of the first tuner circuit 50 being facing the transmission coil 21 of the interrogator 10. In this case, an electromotive force of about 13 $V_{pp}$ was induced at the tag 30 and it resumed its operation. As described above, the inventor has found that the provision of the first tuner circuit 50 raises the intensity of a signal transmitted from the interrogator 10 and that the communication distance by which a signal is transmitted from the interrogator to the tag 30 can be increased.

Detailed experiments were further conducted by the inventor and it has been found that the communication distance depends on the distance D between the transmission coil 21 of the interrogator 10 and the coil 51 of the first tuner circuit 50 and the inner area (or radius) of the coil 51.

Specifically, if the distance D is greater than the radius of the transmission coil 21, it is necessary to set the inner area of the coil 51 equal to or larger than the inner area of the transmission coil 21. That is, the magnetic field generated by a circular coil is generally constant so long as the distance is sufficiently short as compared to the radius of the circular coil. On the other hand, as the distance becomes longer as compared to the circular coil radius, the magnetic field is weakened in inverse-proportion to the third power of the distance. Accordingly, if the coil 51 is placed at a distance greater than the radius of the transmission coil 21, it is necessary that the size of the coil 51 is made equal to or greater than the size of the transmission coil 21. For practical reasons it is very difficult to make the tuning coil much larger than the transmission coil, and therefore a tuning coil having the same size as the transmission coil is used. Namely, when the sizes of the transmission coil and the tuning coil are represented by radii R and r of the equivalent circular coils having the same areas as the transmission coil and tuning coil, then R=r. In this case, the distance D is set to satisfy $2R \leqq D \leqq 3R$.

The inventor has confirmed that the communication distance can be increased by about 50% with the provision of the first tuner circuit 50 when the radius of the transmission coil 21 is about 20 cm, the distance D between the transmission coil 21 and the coil 51 is about 50 cm, and the radius of the coil 51 is about 20 cm. This was confirmed by the experiments made under conditions that the transmission coil 21, transmission/reception coil 31*a* of the tag 30 and coil 51 were disposed on a line and the surfaces of these coils were made parallel to each other. Also with experiments under different conditions, the communication distance can be increased at least by 10 to 20%. Even an increase of the communication distance by 10% is very useful from the viewpoint of electric power.

According to the studies made by the inventor, the communication distance was not affected by changing of the number of turns of the coil 51 or by providing a magnetic core into the coil 51.

Next, the inventor checked how a communication distance of a signal transmitted from the interrogator 10 to the tag 30 changes depending on the presence or absence of the second tuner circuit 70 in the data carrier system. Similar to the first tuner circuit, the experiment showed that the provision of the second tuner circuit 70 was effective to increase the intensity of a signal transmitted from the tag 30 and the communication distance could be increased. In this case, since the transmission/reception coil 31*a* of the tag 30 is small, it is preferable that the coil 71 of the second tuner circuit 70 has an inner area about one-fourth of or smaller than that of the reception coil 22 and larger than that of the transmission/reception coil 31*a*.

In the data carrier system of this embodiment, the intensity of the signal transmitted from the transmission coil can be increased by providing the first tuner circuit having a loop coil disposed facing the transmission coil and being tuned with the frequency of the signal transmitted from the transmission coil. Furthermore, the intensity of the signal transmitted from the transmission/reception coil can be increased by providing the second tuner circuit, having a loop coil disposed concentrically with the transmission coil on the same plane as the transmission coil and being tuned with the frequency of a signal transmitted from the transmission/reception coil of the tag. A communication distance of the signal transmitted between the interrogator and the tag can therefore be increased without increasing an output power of the interrogator. Even if a small size transmission/reception coil of the tag is used, a communication distance obtained when a large size transmission/reception coil, is used can be maintained by virtue of the effects of increasing the communication distance. It is therefore advantageous in that the tag can be made small.

The present invention is not limited only to the above embodiment, but various modifications are possible without departing from the spirit and scope of the invention.

For example, in the above embodiment, the coil of the second tuner circuit is disposed concentrically on the same plane as the transmission coil of the interrogator. This coil of the second tuner circuit is not necessarily required to be disposed on the same plane as the transmission coil of the interrogator, but it may be placed, for example, at the back of the interrogator.

In the above embodiment, a signal is transferred between the interrogator and the tag moving near the interrogator, and the interrogator receives predetermined data stored in the tag. The tag may be structured only to receive a signal from the interrogator and not to transmit an electrical signal back to the interrogator. For example, a tag which emits light upon reception of a signal from the interrogator may be used in the data carrier system of this invention.

As described so far, according to the present invention, the intensity of the signal transmitted from the main apparatus transmission coil can be increased, by providing the first tuner circuit having a loop tuning coil disposed facing the transmission coil of the main apparatus and being tuned with the frequency of the signal transmitted from the main apparatus transmission coil. It is therefore possible to provide a data carrier system capable of increasing a communication distance of the signal from the main apparatus to the tag without increasing an output power of the main apparatus.

What is claimed is:

1. A data carrier system comprising:

a main apparatus including first control means for outputting a first signal and first coil means having at least a transmission coil for transmitting the first signal;

tuner circuit means having a tuner circuit including a tuning coil disposed facing the transmission coil of said first coil means and [adapted to be] tuned with the frequency of the first signal; and a tag including second coil means having at least a reception coil for receiving the first signal transmitted from said main apparatus and second control means for performing predetermined control operation in accordance with the received first signal, wherein said tag moves along a passage between the transmission coil of the main apparatus and said tuning coil of said tuner circuit means and wherein when the sizes of the transmission coil and tuning coil are represented by radii R and r of equivalent circular coils having the same areas as those of the transmission coil and the tuning coil, respectively, R is generally equal to r, and a distance D between said first coil means and said tuner circuit means satisfies the condition of $2R \leqq D \leqq 3R$.

2. A data carrier system according to claim 1, wherein the area of a coil surface of the tuning coil is almost equal to the area of a coil surface of the transmission coil of said first coil means.

3. A data carrier system according to claim 1, wherein said second control means of said tag includes means for generating a second signal in accordance with the received first signal, said second coil means of said tag includes a transmission coil for transmitting the second signal, and said first coil means of said main apparatus includes a reception coil for receiving the second signal transmitted from the transmission coil of said tag.

4. A data carrier system according to claim 3, wherein the reception and transmission coils of said second coil means of said tag are formed of a single common transmission/reception coil.

5. A data carrier system according to claim 4, wherein the reception and transmission coils of said first coil means of said main apparatus are formed of loop circular coils disposed concentrically, and a radius of the reception coil is larger than a radius of the transmission coil.

6. A data carrier system according to claim 5, further comprising:

second tuner circuit means having a tuner circuit being tuned with the frequency of the second signal transmitted from said tag, the tuner circuit including a second tuning coil of a loop circular shape disposed concentrically with the reception coil of said first coil means of said main apparatus and a second capacitor connected in parallel to the second tuning coil.

7. A data carrier system according to claim 6, wherein the second tuning coil has an inner area one-fourth of or smaller than an inner area of the reception coil of said first coil means, and larger than the inner area of each of the transmission and reception coils of said second coil means of said tag.

8. A data carrier system according to claim 1, wherein the transmission coil of said first coil means of said main apparatus is a circular coil, and the tuning coil of said tuner circuit means is a circular coil having the same radius as the circular coil of the transmission coil.

9. A data carrier system comprising:

a tag including first coil means having a transmission coil and a reception coil; control means for performing control operations in accordance with a first signal received externally by the reception coil and generating at least a second signal; and means for transmitting the second signal via the transmission coli;

a main apparatus including second coil means having a transmission coil of a loop circular shape and a reception coil of a loop circular shape disposed concentrically with the transmission coil, the transmission coil transmitting a signal to said tag through electromagnetic coupling with the reception coil of said first coil means of said tag, and the reception coil receiving a signal transmitted from said tag through electromagnetic coupling with the transmission coil of said first coil means of said tag; and tuner circuit means having a tuner circuit including a tuning coil of a loop circular shape disposed concentrically with the reception coil of said second coil means and a tuning capacitor connected in parallel to the tuning coil, wherein when the sizes of the transmission coil and tuning coil are represented by radii R and r of equivalent circular coils having the same areas as those of the transmission coil and tuning coil, respectively, R is generally equal to r, and a distance D between said first coil means and said tuner circuit means satisfies the condition of $2R \leqq D \leqq 3R$.

10. A data carrier system according to claim 9, wherein the tuning coil has a size larger than the reception coil of said second coil means of said main apparatus.

11. A data carrier system according to claim 9, wherein the transmission coil and the reception coil of said tag are formed of a single common transmission/reception coil.

12. A tag monitor for use with a data carrier system comprising:

a main apparatus including first control means for outputting a first signal and first coil means having at least a transmission coil for transmitting the first signal toward a tag to be monitored; and tuner circuit means having a tuner circuit being tuned with the frequency of the first signal, said tuner circuit means being disposed spaced apart from said main apparatus by a predetermined distance, and the tuner circuit having a tuning coil disposed facing the transmission coil of said first coil means and a capacitor connected in parallel to the tuning coil, wherein when the sizes of the transmission coil of said first coil means and the tuning coil of said tuner circuit means are represented by radii R and r of equivalent circular coils having the same areas as those of the transmission coil and the tuning coil, respectively, and R is almost equal to r, a distance between said first coil means and said tuner circuit means satisfies the condition of $2R \leqq D \leqq 3R$.

13. A tag monitor according to claim 12, further comprising a passage provided between said main apparatus and said tuner circuit means for allowing the tag to be monitored to pass therethrough.

14. A tag monitor according to claim 12, wherein the size of a coil surface of the transmission coil of said first coil means is equal to the size of a coil surface of the tuning coil.

15. A tag monitor according to claim 12, wherein said first coil means of said main apparatus includes a reception coil for receiving a second signal transmitted from the tag to be monitored, and the transmission coil and the reception coil of said first coil means are both formed of a circular loop shaped and disposed concentrically.

16. A tag monitor according to claim 15, wherein said reception coil of said first coil means has a radius smaller than that of said transmission coil.

* * * * *